United States Patent [19]
Suzuki et al.

[11] Patent Number: 5,890,139
[45] Date of Patent: Mar. 30, 1999

[54] ANSWERING METHOD AND SYSTEM IN ONLINE SHOPPING

[75] Inventors: Tetsujiro Suzuki; Yuriko Kashu, both of Kawasaki, Japan

[73] Assignee: Fujitsu Limited, Kawasaki, Japan

[21] Appl. No.: 680,968

[22] Filed: Jul. 16, 1996

[30] Foreign Application Priority Data

Dec. 8, 1995 [JP] Japan .................................. 7-320910

[51] Int. Cl.⁶ .................................................. G06F 17/60
[52] U.S. Cl. ................ 705/27; 705/26; 705/27; 707/102; 379/45
[58] Field of Search ............... 705/27, 14, 10; 395/10, 50; 382/100

[56] References Cited

U.S. PATENT DOCUMENTS

| | | | |
|---|---|---|---|
| 5,305,196 | 4/1994 | Deaton et al. | 705/10 |
| 5,379,337 | 1/1995 | Castillo et al. | 379/45 |
| 5,541,981 | 7/1996 | Lynn | 379/67 |
| 5,638,457 | 6/1997 | Deaton et al. | 382/100 |
| 5,659,469 | 8/1997 | Deaton et al. | 705/14 |

FOREIGN PATENT DOCUMENTS

2/116242  4/1990  Japan .

*Primary Examiner*—Allen R. MacDonald
*Assistant Examiner*—Jagdish N Patel
*Attorney, Agent, or Firm*—Staas & Halsey

[57] ABSTRACT

An online shopping system and method is provided in which a mail-order business is performed between a center and a terminal via an online communication system. An answer to a question asked by a customer is provided from minimum necessary answers to questions prepared in a database. The database is searched when the customer asks a question A, and, when an answer A to the question A is present in the database, the answer A is transmitted to the customer via the online communication system. An answer B is prepared when an answer to the question A is not present in the database. The answer B is stored in the database; and the answer B is transmitted to the customer via electronic mail.

16 Claims, 8 Drawing Sheets

| CUSTOMER ID | ARTICLE NUMBER | QUESTION TYPE | QUESTION MESSAGE |
|---|---|---|---|
| A B C 1 2 3 4 | 1 2 3 4 5 | 1 1 1 | — |

FIG.7

| ARTICLE ID | ARTICLE NAME | PRICE | SIZE | COLOR | QUESTION TYPE | | | | | |
|---|---|---|---|---|---|---|---|---|---|---|
| | | | | | 1 | 2 | 3 | 4 | 5 | 6 |
| 12345 | FLOWER-PATTERN ONE-PIECE DRESS | 20,000 | M | PINK | 111 | 112 | 113 | 114 | 115 | — |

| CUSTOMER ID | ARTICLE NUMBER | QUESTION TYPE | QUESTION MESSAGE |
|---|---|---|---|
| ABC1234 | 12345 | 000 | HOW MANY CENTIMETERS THE LENGTH OF THE ARTICLE |

300

ANSWERING METHOD AND SYSTEM IN ONLINE SHOPPING

BACKGROUND OF THE INVENTION

1. Field of the Invention

The present invention relates to an answering method and system for use in online shopping. In particular, the present invention relates to an answering method and system for online shopping, wherein, in the course of using an online mail-order business, a customer inquires of the center (of the online shopping system) about goods which the customer buys or wishes to buy through online shopping.

2. Description of the Related Art

In a traditional case, where goods are introduced to a customer in a traditional way, that is, through a catalog sent via traditional mail (not electronic mail) and so forth, or through other media, without using an online communication system, If the customer has a question about the introduced goods, the customer may directly call a company or the like which handles the goods and inquire thereof about the goods. In such a case, the customer tells the company the trade names, article identification numbers, and so forth, of the goods. Then, the customer may obtain an answer as to how to use the goods, a payment method when buying the goods, and so forth, from a person in the customer service division in the company.

However, in an online mail-order case, goods information is transmitted to a customer from the center (the sales company) via the online communication system. In response thereto, the customer may make an order for an article and transmit this information to the center via the online communication system. Therefore, in such a case, it is not possible to perform direct conversation between the customer and the center (the sales company). A database has been considered for explaining goods and answering possible customer's questions. However, the contents of the customer's questions may vary for each particular customer. Therefore, the database which can answer various possible questions of the customer needs to have a very large amount of data and thus may be inefficient. Further, when assuming all possible customer's questions about the goods and preparing answers thereto, it is not possible that customers actually ask all the assumed possible questions. Therefore, a database may not be an efficient way to prepare all the answers for all the assumed possible customer's questions.

SUMMARY OF THE INVENTION

The present invention has been developed in consideration of the above-described problems. An object of the present invention is to provide answering method and system in online shopping which enables, in an online communication system, easy production of data for answering customer's questions and preparation of answers to general questions.

Another object of the present invention is to provide an answering method and system, in online shopping, which enables, in a case where complete answers could not be prepared for all the possible questions, an answer to be transmitted to the customer when the answer has been prepared for a particular question given by the customer via electronic mail.

According to a first aspect of the present invention, in online shopping in which a mail-order business is conducted between a center and a terminal via an online communication system, for answering a question of a customer, necessary but minimum answers to questions are prepared in a database; the database is searched when the customer asks a question A, and, when an answer A to the question A is present in the database, transmits the answer A to the customer via the online communication system; an answer B is prepared when an answer to the question A is not present in the database, and the answer B is stored in the database; and the answer B is transmitted to the customer via electronic mail.

According to a second aspect of the present invention, the question A is stored as inquiring screen image information to be transmitted to customers, when an answer to the question A is not present in the database.

According to a third aspect of the present invention, the customer is able to input any other question when the customer wishes to ask a question other than predetermined questions previously stored in an inquiring screen image information; any other question asked by the customer is temporarily stored when receiving any other question; any other question and an answer thereto are stored as a question and answer set, when the answer thereto is prepared; and, at an any point of time, the database and the inquiring screen image information are updated using the question and answer set.

According to a fourth aspect of the present invention, in online shopping in which a mail-order business is performed between a center and a terminal via an online communication system, for answering a question asked by a customer, there is provided an answer database for previously storing necessary but minimum answers to questions; question item determination means for receiving a question A from the customer and determining whether or not the question A is included in predetermined question items; search means for searching the answer database when the question item determination means has determined that the question A is included in the predetermined question items; online transmission means for transmitting to the terminal, via an online communication system, an answer A obtained by the search means; answer requesting means for requesting an answer when the question item determination means has determined that the question A is not included in the predetermined questions; updating means for updating the answer database using an answer B after the answer B is obtained through the answer requesting means; and electronic mail transmission means for transmitting the answer B to the terminal via electronic mail after the answer B is obtained through the answer requesting means.

According to a fifth aspect of the present invention, the updating means includes goods master file updating means for adding a question type code representing the question A to at least one predetermined question type of a goods master file when the question A has received the answer B. The goods master file stores the at least one predetermined question type corresponding to a question item relevant to an article code of an article that the customer selected.

According to a sixth aspect of the present invention, the updating means comprises inquiring screen image information updating means for adding the question A to the inquiring screen image information to be displayed to the customer, when the question A has not been included in the inquiring screen image information yet.

According to a seventh aspect of the present invention, the electronic mail transmission means transmits the answer B only to the terminal that asked the question A.

In the first and fourth aspects of the present invention, answers to all possible questions are not prepared in the database. Only necessary but minimum answers for goods which can be obtained in regular patterns are prepared in the database. Then, when the customer gives a new question, an answer to which is not included in the database, an answer is transmitted to the customer via electronic mail and also the answer is additionally stored in the database. Thus, answers are automatically accumulated in the database. The thus-accumulated answers can also be provided for other customers when receiving questions from other customers. Further, because answers to all possible questions are not prepared, it is possible to reduce manpower costs and also to reduce otherwise necessary data storage capacity.

In the second and sixth aspects of the present invention, similar to the accumulation of answers in the database, all expected question items are included in the inquiring screen image information to be displayed to the customer. New question items that customers input are automatically additionally included in the inquiring screen image information. Thus, question items are automatically accumulated in the inquiring screen image information. Similar to the above-described first and fourth aspects, it is possible to reduce manpower costs and also to reduce otherwise necessary data storage capacity.

In the third aspect of the present invention, when the customer inputs a question item which has not been stored yet, the input question is stored in a predetermined file. Then, after an answer to that question is obtained, the answer is stored together with the question as a set. Thereby, it is possible to update the database and inquiring screen image information at any point of time using the stored answer and question set. Therefore, it is possible to perform the updating operation when periodically updating general information. It is also possible to perform the updating operation immediately after the answer is obtained. Thus, the updating operation is free from any time condition.

In the fifth aspect of the present invention, each inquiring screen image information is provided for a respective article code stored in the goods master file. Further, a type code is given in the goods master file for each question item. When a question is asked by the customer and a type code of the given question item has not been stored in the goods master file, a new type code is additionally stored in the goods master file similar to updating of the database and inquiring screen image information. Thereby, it is possible to keep consistency between the data stored in the goods master file, database and inquiring screen image information. Thereby, it is possible to prevent the amount of data transfer between the center and terminals from unnecessarily increasing.

In the seventh aspect of the present invention, when a customer asks a new question, an answer that is prepared for the question afterward is then transmitted only to that customer. That is, it is not necessary to transmit the answer to other customers because the other customer do not need that answer. Thereby, it is possible to prevent the amount of data transfer between the center and terminals from unnecessarily increasing.

Thus, according to the present invention, when an answer does not exist in the database, the answer is obtained from sales staff, the obtained answer is sent only to a customer who requested the answer, and a database and so forth are appropriately updated using the obtained answer. Thereby, after the updating, other customers can obtain the same answer by an easy regular question-item selection operation.

Other objects and further features of the present invention will become more apparent from the following detailed description when read in conjunction with the accompanying drawings.

DETAILED DESCRIPTION OF A PREFERRED EMBODIMENT

Figure 1:
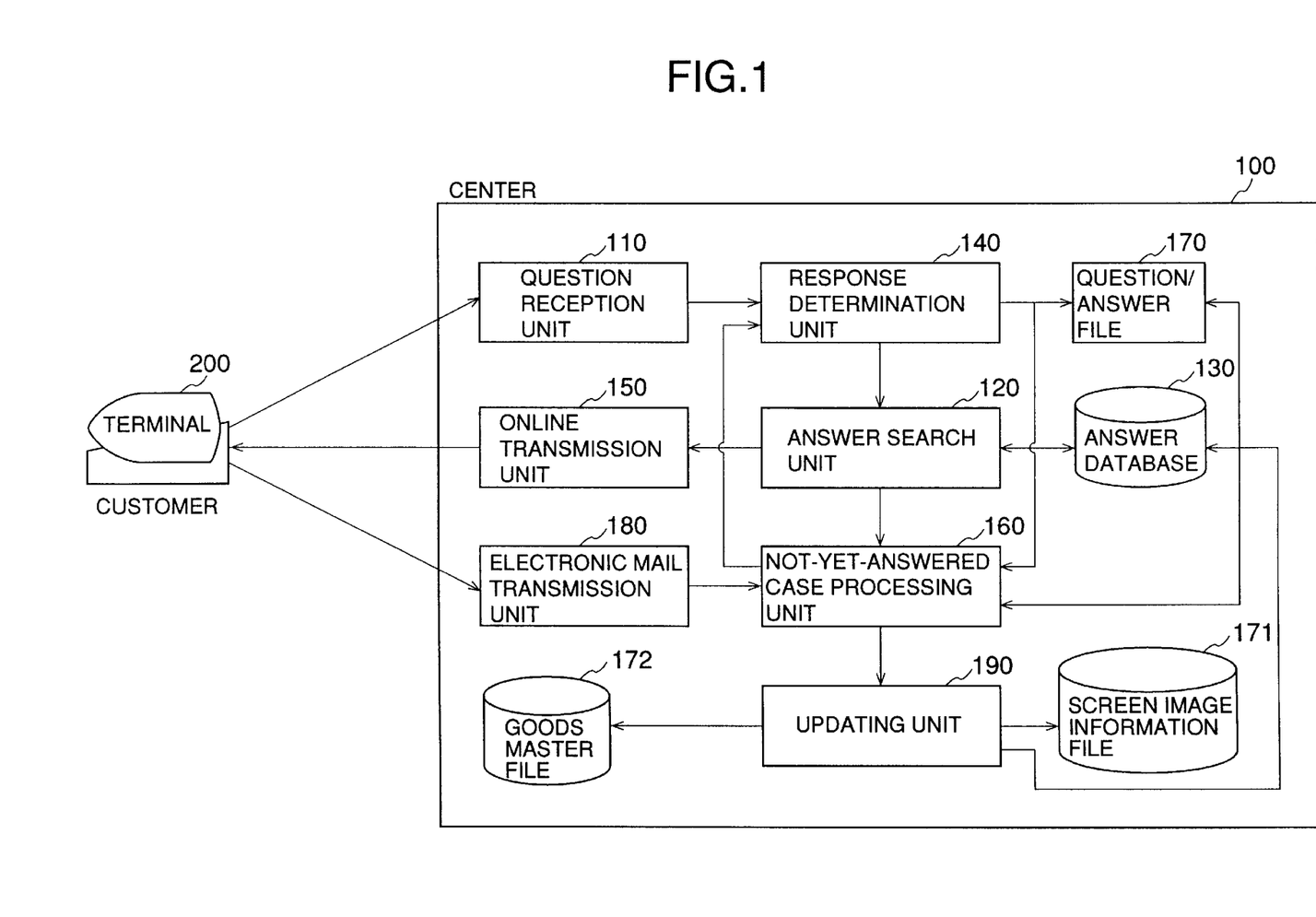
FIG. 1 shows a system structure in an example of a goods information answering system in the present invention.

FIG. 1 shows a system structure in an example of a goods information answering system of the present invention. The system shown in the figure includes a center 100 which provides goods information to customers and also answers customer's questions, and a customer's terminal 200, the customer being a member of an online shopping network.

The center 100 includes a question reception unit 110, an answer search unit 120, answer database 130, a response determination unit 140, an online transmission unit 150, a not-yet-answered case processing unit 160, a question/answer file 170, a screen image information file 171, a goods master file 172, an electronic mail transmission unit 180 and an updating unit 190.

The above-described system of the present invention shown in FIG. 1 can be practiced using a general-purpose computer that is specially configured by predetermined software stored in a computer-usable medium. The above-mentioned database and files 130, 170, 171 and 172 shown in the figure can be data files, respectively, stored in one or a plurality of general-purpose storage devices, such as a hard disc drive device(s), floppy disc drive device(s), RAM(s) and/or the like. In a case where a plurality of files are stored in a single common storage device, the storage area of the common storage device is allocated for the files individually in a well-known manner. The goods master file 172 may be a data file, the data of which can be updated.

Further, in the above-described system, it is assumed that the system uses the online communication system in which the terminal 200 and the center 100 are electronically connected and communicate information to one another. However, application of the present invention is not limited to such an arrangement. It is also possible to practice the present invention through a stand-alone computer. In this case, the terminal 200 and online transmission unit 20 of the center can be removed from the system. Then, the question reception unit 110, answer search unit 120 and electronic mail transmission unit 180 may directly communicate information with an external system.

The question reception unit 110 receives a customer's question concerning an article of goods via the terminal 200, and transfers the question to the response determination unit 140.

Figure 2:
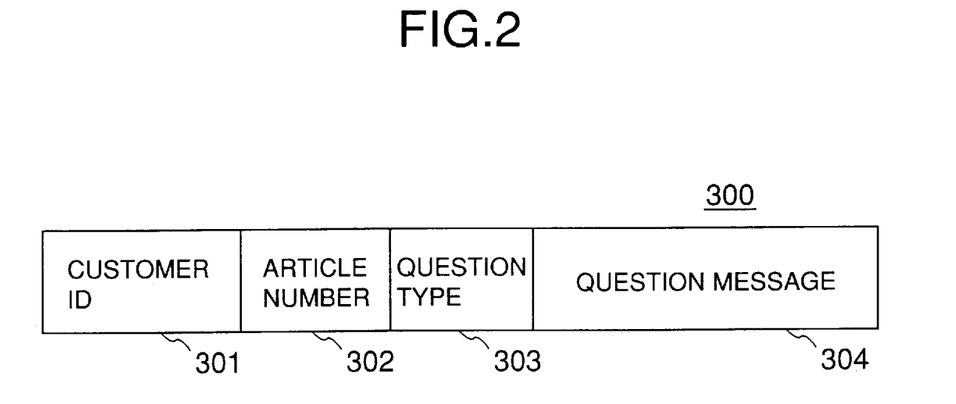
FIG. 2 shows a structure in an example of question information used in the system shown in FIG. 1.

Based on the contents of the transferred question, the response determination unit 140 determines, according to a predetermined procedure described later, whether or not an answer to that question is stored in the answer database 130. When the determination is made that an answer to that question is stored in the answer database 130, the response determination unit 140 instructs the answer search unit 120 to search the answer database 130 for that answer. When the determination is made that no answer to that question is stored in the answer database 130, the response determination unit 140 instructs the not-yet answered case processing unit 160 to create an answer to that question, and also stores that question in the question/answer file 170. The question is stored in the question/answer file 170 in the form of the question information shown in FIG. 2. As shown in the figure, the question information includes the customer ID 301, an article number 302 of the article of goods, a question type 303 and a question message 304. A question is asked by a customer about a particular article of goods, which article has a particular article number 302. The question type 303 is one of preset types and another type. For example, with reference to FIG. 3A, a screen image A shown in the figure is read out from the screen image information file 171 and then is displayed on the terminal 200. Then, if the customer clicks, e.g., operates a "mouse", when a cursor is positioned in an 'inquiring' box, an inquiring screen image B shown in FIG. 3B is read out from the screen image information file 171 and is then displayed instead. (Clicking when a cursor is in something will be simply referred to as 'clicking something'.) Each question type indicated in the screen image B has a question type code given thereto, For example, for the question type such as 'question for a lining', the question type code '111' is given. For the question type such as 'other questions', the question type code '000' is given. The customer may click one of the six question types indicated in the screen image B. When the customer clicks the 'other question' box, having the code '000' as mentioned above, the code '000' is recognized by the terminal 200 and thus a screen image C shown in FIG. 4 is read out from the screen image information file 171 and is then displayed on the terminal 200. Then, the customer may input the question message (through keying in or the like, for example). The thus-input message is stored as the question message 304 shown in FIG. 2. The response determination unit 140, when receiving question information such as that shown in FIG. 2 having the question type '000' which is given for questions other than the preset questions, does not search the database 130 but leaves the question processing to the not-yet-answered processing unit 160.

The answer database 130 initially stores a certain number of answers which can be previously considered. Then, when an answer is created, in a procedure described below, through the not-yet-answered case processing unit 160 in response to a given question having the above-mentioned code '000', the created answer is additionally stored in the answer database 130. Thus, the answer database 130 becomes expands and more responsive to questions.

The answer search unit 120 searches the answer database 130 using the question type 303 of the given question information. Then, the answer search unit 120 transfers a thus-retrieved answer to the online transmission unit 150.

The online transmission unit 150 transmits search unit 120, to the terminal 100 through the online communication system.

When the response determination unit 140 has determined that the answer database 130 does not have an answer, to a given question, previously stored therein, the not-yet-answered case processing unit 160 requests an operator of the center 100 to create an answer to the question and also stores the question in the question/answer file 170. When the operator creates and inputs to the center 100 an answer to the question, the not-yet-answered case processing unit 160 stores the answer in the question/answer file 170, edits the answer into an electronic mail format, and transfers the electronic-mail-format answer to the electronic mail transmission unit 180. Further, the not-yet-answered case processing unit 160 controls the updating unit 190 to update the answer database 130 as will be described later.

In the case where it has been determined that the answer database 130 does not have an answer to the given question previously stored therein, the question/answer file 170 stores the question therein, and, also, stores therein the thus-created answer to that question when the answer has been created and input by the operator. The storage of the answer is performed in a manner in which the stored answer may be immediately obtained when that storage question is accessed.

When the answer to the question has been created and input by the operator afterward, the electronic mail transmission unit 180 transmits the electronic-mail-format answer, which has been edited by the not-yet-answered case processing unit 160, to the customer via electronic mail.

When having obtained the answer to the question of the type code '000', in response to instructions by the not-yet-answered case processing unit 160, the updating unit 190 additionally stores the obtained answer in the answer database 130, and, also, updates the information of the inquiring image screen B shown in FIG. 3B stored in the screen image information file 171. Thus, the inquiring screen image B for the article comes to include an indication of a new question type relevant to that question, the answer of which has been newly created. Further, the updating unit 190 adds a new type code representing that new question type to a set of type codes provided for the article number in the goods master file 172.

Figure 5:
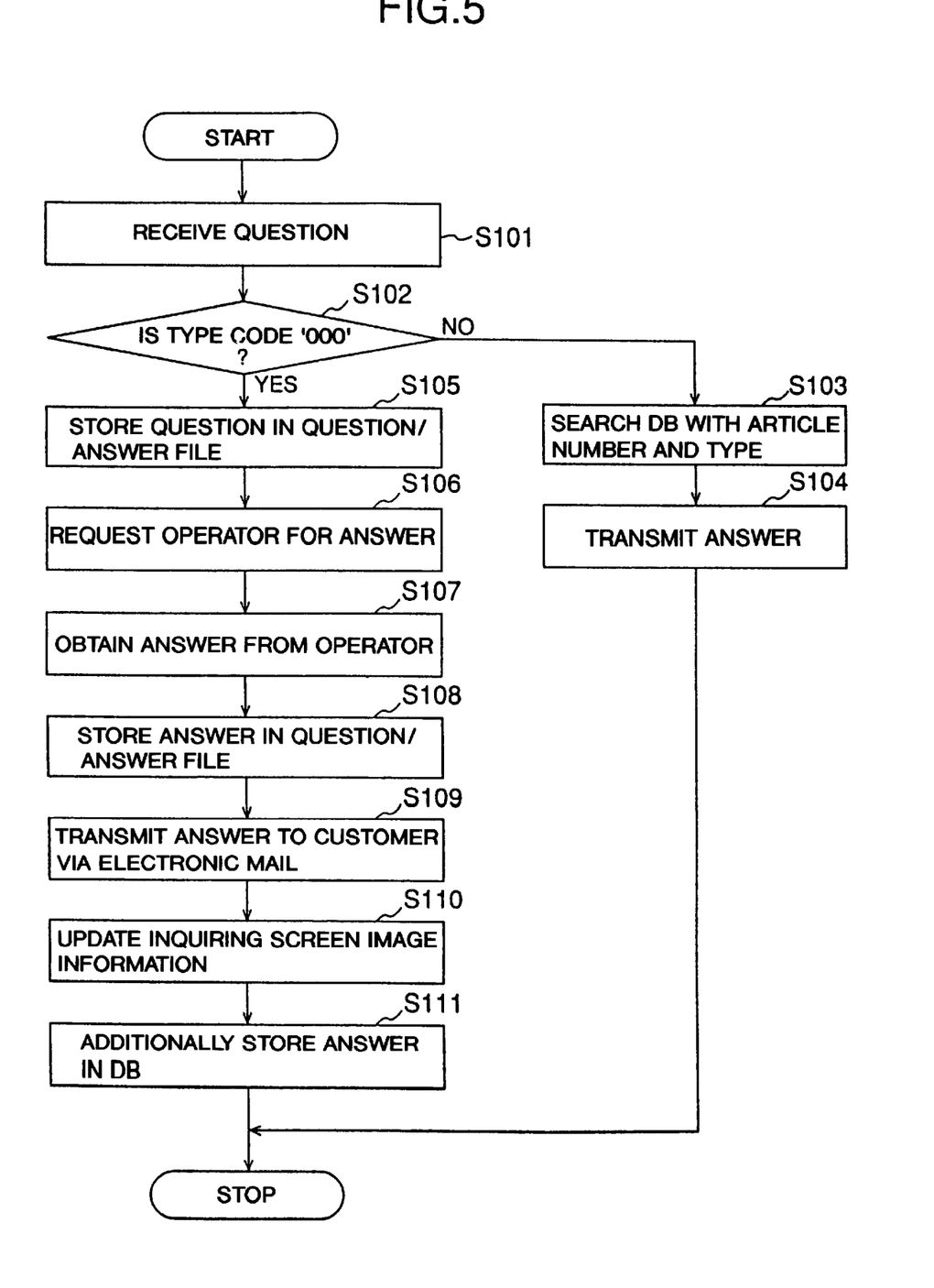
FIG. 5 shows an operation flowchart in an example of the system shown in FIG. 1.

FIG. 5 shows an operation flowchart of the goods information answering system in the present invention.

Step S101) The question reception unit 110 receives a question from a customer, and provides relevant question information.

Step S102) The response determination unit 140 refers to the question type 303 of the provided question information, and thus determines whether or not the question from the customer is of the type of the type code '000'. If it is determined that the question type is of the type code '000', a step S105 is performed.

Step S103) When the question type is not of the type code '000', the answer search unit 120 uses the article number 302 and question type 303, and thus searches the answer database 130. If an answer cannot be retrieved as a result of the search, an error signal is output.

Step S104) The answer obtained from the answer database 130 in the step S103 is transferred to the online transmission unit 150. Thereby, the online transmission unit 150 transmits the answer to the terminal 200 through which the customer submitted the question.

Step S105) When the question type 303 of the question information has the type code '000' in step S102, the response determination unit 140 stores the question in the question/answer file 170.

Step S106) The response determination unit 140 informs the not-yet-answered case processing unit 160 of the determination that the question with the type code '000' has been received. Thereby, the not-yet-answered case processing unit 160 requests an operator of the center 100 for an answer to the question.

Step S107) The operator creates and inputs an answer to that question to the center 100.

Step S108) The not-yet-answered case processing unit 160 stores the input answer in the question/answer file 170.

Step S109) The not-yet-answered case processing unit 160 edits the input answer into the electronic mail format and transfers it to the electronic mail transmission unit 180. The electronic mail transmission unit 180 sets an address for the electronic mail and transmits the electronic mail to the terminal 200 of the address.

Step S110) The not-yet-answered case processing unit 160 instructs the updating unit 190 to perform file updating, and, also, informs the response determination unit 140 of the above-mentioned new type code relevant to those question and answer. The updating unit 190 obtains from the question/answer file 170 the question which was received in the step S101, and additionally sets the question type of the obtained question in the inquiring screen image B in the screen image information file 171.

Step S111) The updating unit 190 additionally stores that answer input in the step S107 in the answer database 130.

Figure 3A:
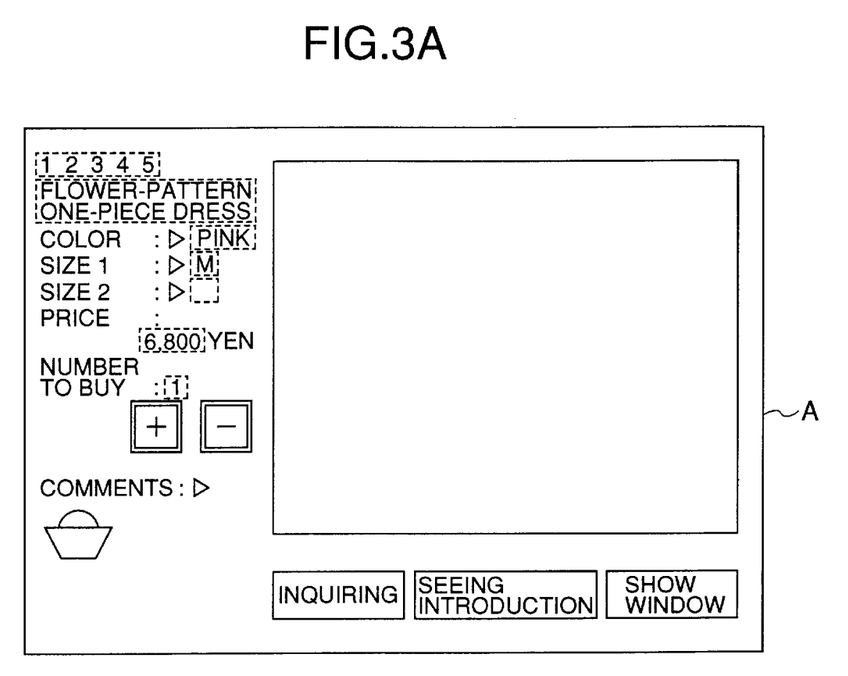
FIGS. 3A, 3B and 4 show screen images in an example when a customer makes an inquiry in the system shown in FIG. 1.
Figure 3B:
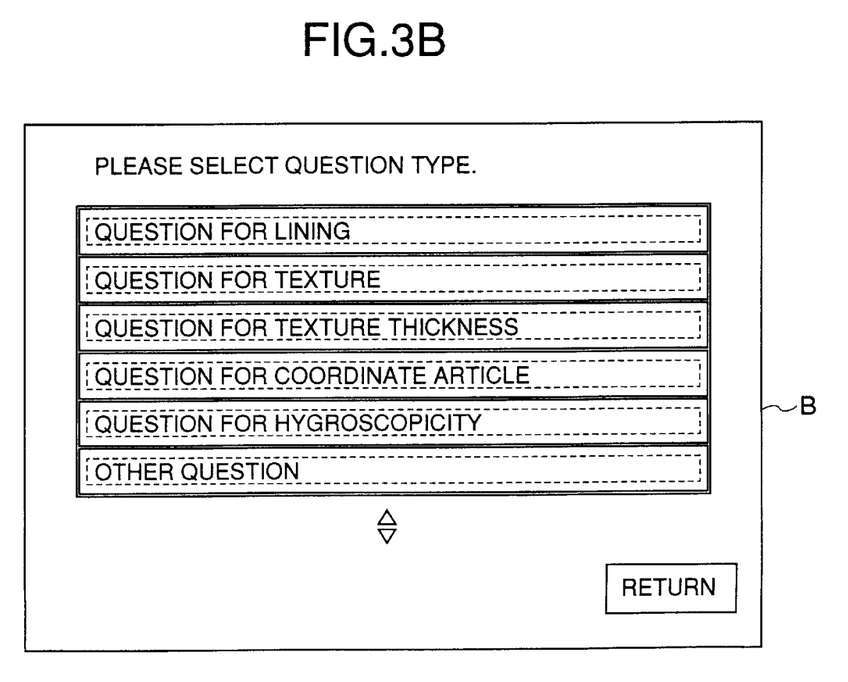
Figure 4:
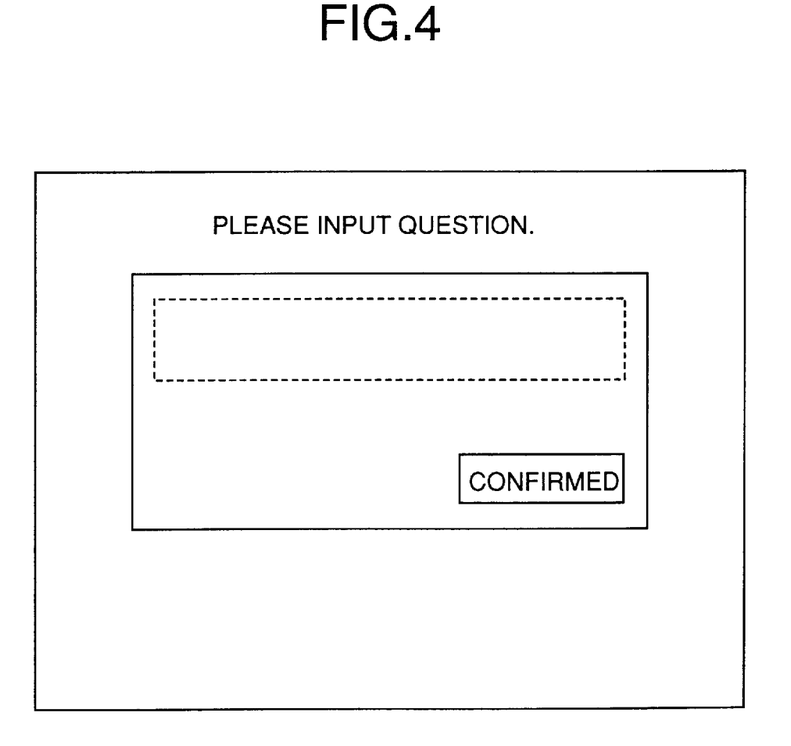

In the goods information answering system in the present invention, for each article number (article type), for example, for the identification number 12345 of the flower-pattern one-piece dress shown in FIG. 3A, expected question items (types) are previously set and stored in the screen image information file 171, and, also, answers to those question items are previously stored in the answer database 130. Thereby, when a question is input by a customer, the question is answered through the online communication system immediately when the question type is a question to which an answer was previously stored in the answer database 130. When the given question is a question to which an answer was not previously stored in the answer database 130, an answer is transmitted to the customer via electronic mail after the answer has been prepared.

Further, the thus newly obtained answer is additionally stored in the answer database 130, and, also, the question, to which that answer has been obtained, is additionally set in the inquiry screen image information. Thereby, even though all of the answers which can be expected are not previously stored in the answer database 130, by adding new answer data, obtained from actual customer's questions, to the previously stored answer data, the thus-added new answer data may be used for responding to the same questions given by other customers immediately through the online communication system.

An embodiment of the present invention will be described with reference to the drawings.

First, a case where the question type asked by the customer is represented by a type code other than '000'.

(1) In a case where the customer wishes to know the material of the article (flower-pattern one-piece dress) of the article number '12345', when the terminal 200 displays the screen image A shown in FIG. 3A, the customer clicks the 'inquiring' box on the screen image. As a result, the inquiring screen image B shown in FIG. 3B is displayed.

Figure 6:
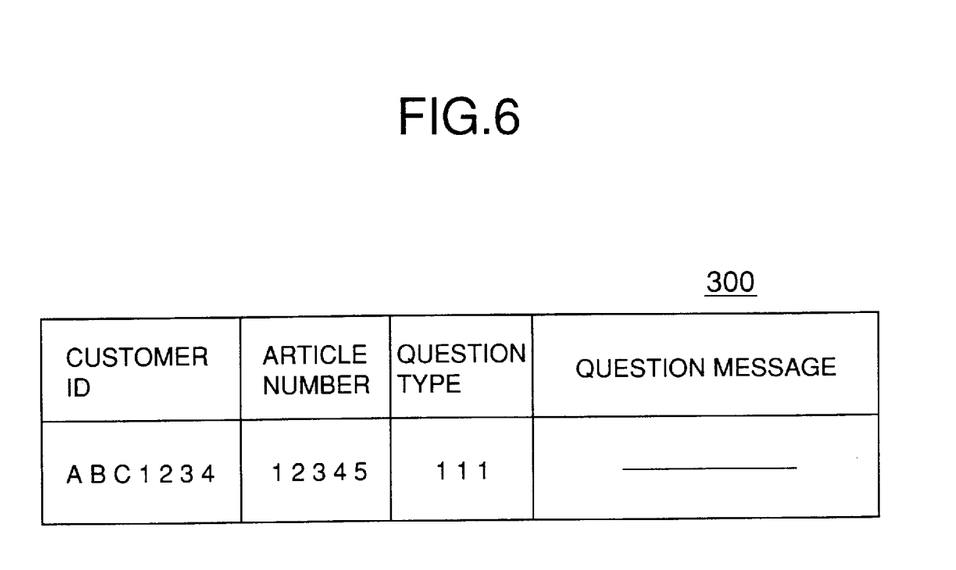
FIG. 6 illustrates the contents of question information in an embodiment of the present invention.

(2) Then, the customer clicks the 'question for lining' box on the screen image. At this time, the goods master file 172 stores data shown in FIG. 7. The type code '111' is given to 'question for lining', '112' is given to 'question for texture', '113' is given to 'question for texture thickness', '114' is given to 'question for coordinate article' and '115' is given to 'question for hygroscopicity'. Accordingly, the question information in this case has data shown in FIG. 6. In the example shown in FIG. 6, the question type 303 of the question information 300 has the type code '111'.

(3) The question information generated in the above-described step (2) is transmitted to the response processing unit 140 of the center 100, shown in FIG. 1. Because the type code of the question type of the thus-transmitted question information is not '000', the response determination unit 140 instructs the answer search unit 120 to search the answer database 130.

(4) The answer search unit 120 searches the answer database 130, and thus obtains an answer that 'the article is provided with a lining of polyester 100%' to that question, i.e., 'question for lining'.

Figure 8:
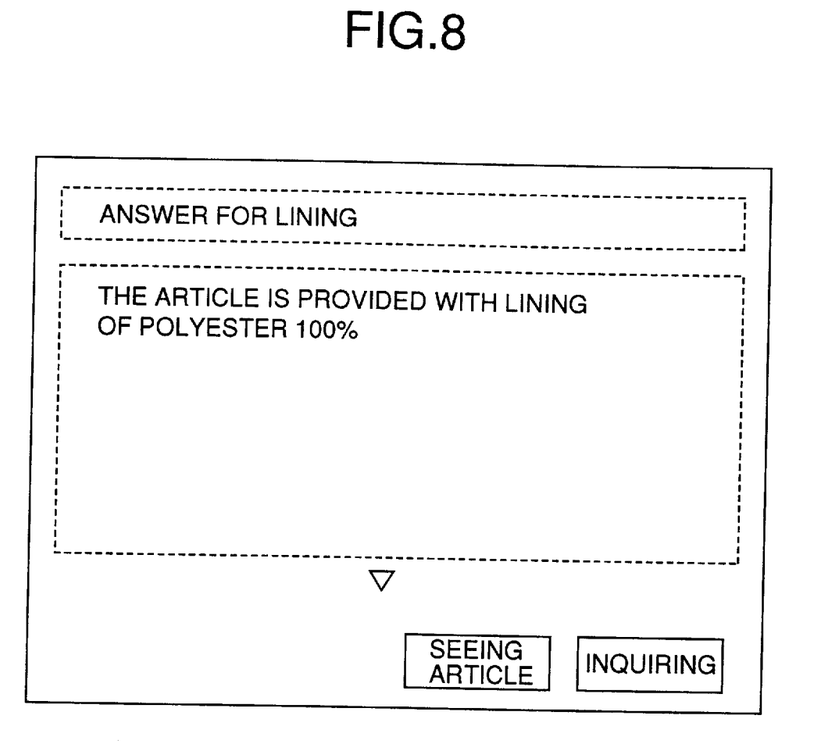
FIG. 8 shows a screen image indicating an answer in an example of the embodiment of the present invention.

(5) The obtained answer is transferred to the online transmission unit 150 and transmitted to the terminal 200. As a result, the terminal 200 displays a screen image shown in FIG. 8 which indicates the obtained answer.

The case where the question information 300 generated in response to a customer inputting a question is of the question type of '000' will be described.

(1) In a case where the customer wishes to know the length of the article (flower-pattern one-piece dress) of the article number '12345', when the terminal 200 displays the screen image A shown in FIG. 3A, the customer clicks the 'inquiring' box on the screen image. As a result, the inquiring screen image B shown in FIG. 3B is displayed.

Figure 9:
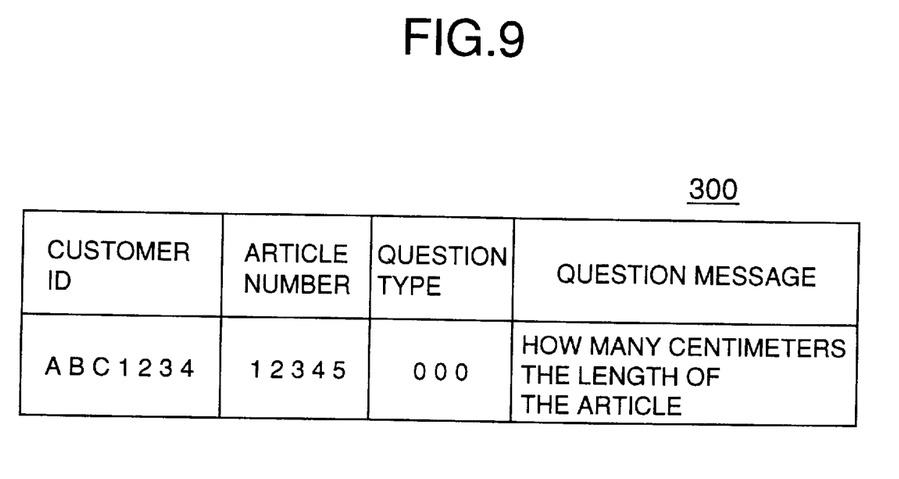
FIG. 9 illustrates the contents of other question information in an embodiment of the present invention.

(2) Then, the customer clicks the 'other question' box on the screen image. Thereby, the screen image shown in FIG. 4 is displayed. The customer inputs the question that 'how many centimeters is the length of the article' (through keying in or the like, for example) in a predetermined area on the displayed screen image. At this time, the goods master file 172 stores data shown in FIG. 7, and no type code is given to the 'other question'. In this case, the type code '000' is automatically set in the question information 300 as shown in FIG. 9, and the input message of 'how many centimeters is the length of the article' is set as the question message of the question information as shown in FIG. 9.

(3) When the center 100 receives the question information generated in the step (2) as described above, because the question of the received question information is of the type code '000', the response determination unit 140 stores the question message of 'how many centimeters is the length of the article' of the received question information in the question/answer file 170. Then, the response determination unit 140 informs the not-yet-answered case processing unit 160 of the determination result that no answer to the received question information is stored in the answer database 130.

(4) The not-yet-answered case processing unit 160 generates an answer request to an operator of the center 100. Specifically, the center 100 displays the message requesting the operator to input an answer to that question.

(5) When the operator inputs (through keying in or the like, for example) to the center 100 an answer of '90 centimeters' to that question, the not-yet-answered case processing unit 160 stores the input answer in the question/answer file 170.

(6) Then, the not-yet-answered case processing unit 160 edits this answer into the electronic mail format, and transfers a message that 'the inquired length of the flower-pattern one-piece dress is 90 centimeters' to the electronic mail transmission unit 180. Thereby, the electronic mail transmission unit 180 transmits the message to the terminal via electronic mail.

(7) The not-yet-answered case processing unit 160 instructs the updating unit 190 to update the data stored in the screen image information file 171, answer database 130 and goods master file 172.

(8) The updating unit 190 reads out the question 'how many centimeters is the length of the article' from the question/answer file 170, appropriately edits the question into a question type format such as 'question for length' or the like. The updating unit 190 adds the thus-obtained new question type in the inquiring screen image B shown in FIG. 3B stored in the screen image information file 171 for the article number '12345'.

(9) Further, the updating unit 190 updates the data stored in the answer database 130. Thus, a new question type code '116' is given to the new question for the article number, and also the answer '90 centimeters' is added for the question of the type code '116'.

Figure 7:
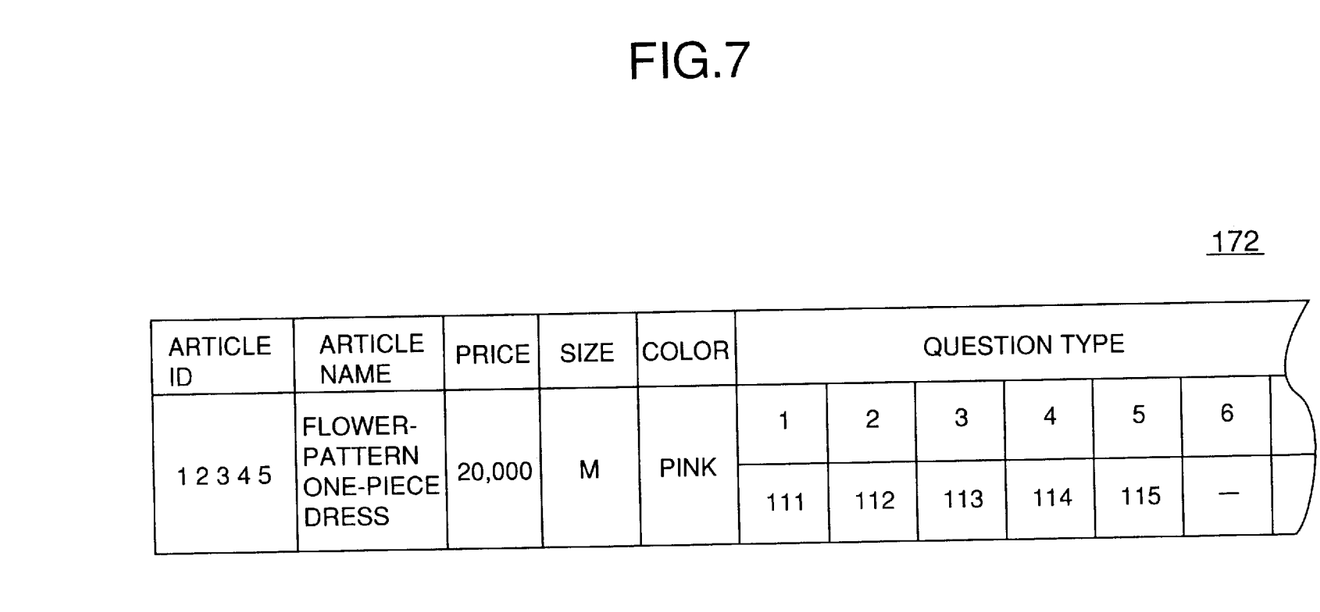
FIG. 7 shows a data structure stored in a goods master file in the embodiment of the present invention.

(10) Finally, the updating unit 190 updates the data stored in the goods master file 172 and thus inserts the new type code '116' in the item '6' of the question type shown in FIG. 7.

Thereby, even if a specific question type that a customer wishes to inquire about is not displayed in the inquiring screen image, the customer may input a specific question to the terminal 200. Then, after an answer to the input specific question has been created, the answer is transmitted to the customer through the terminal 200 via electronic mail. Further, even though the answer database 130 does not initially store answers to all possible questions, an answer created to a question newly input by a customer may be appropriately added in the answer database 130. Therefore, it is not necessary to initially store answers which may be useless.

An answer created for response to a question newly input by a customer is transmitted only to that customer. It is not necessary to transmit the answer to other customers in parallel.

The time the updating unit 190 updates the data stored in the answer database 130, goods master file 172 and screen image information file 171 can be arbitrarily determined by storing a newly input question and answer thereto in the question/answer file 170. It is not necessarily needed to perform the updating immediately after the answer is input by an operator.

In the above-described embodiment, the response determination unit 140 determines whether or not the answer database 130 should be searched. However, it is not necessary to be limited to this way. It is also possible to configure the system such that the question type code and article number (ID) of a given question are used as key information and thus the answer database is searched, directly. Then, when an answer to the question cannot be obtained as a result of the search, an answer is created, as described above, and the created answer is used for updating the answer database 130, and updating the inquiring screen image stored in the screen image information file 171.

Further, the present invention is not limited to the above-described examples and embodiment, and variations and modifications may be made without departing from the claimed scope of the present invention.

What is claimed is:

1. An answering method, for providing answers to questions submitted to an online sales center via an online communication system, by online customers, said method comprising the steps of:

preparing a database including answers respectively corresponding to a minimum necessary plurality of expected customer questions;

searching the database when a customer submits a question and, when a stored answer to the question is found in the database, transmitting the stored answer to the customer via the online communication system;

generating a request for a new answer to be prepared when a stored answer to the question is not found in the database;

preparing the new answer in response to the request and storing the new answer in the database, the new answer including information input to a computer system coupled to the database in response to an indication that a stored answer to the question is not found in the database; and transmitting the new answer to the customer via electronic mail.

2. The method according to claim 1, further comprising the step of storing the question as inquiring screen image information to be transmitted to the customer when a stored answer to the question is is not found in the database.

3. The method according to claim 1, further comprising the steps of:

authorizing the customer to input the question when the question is a new question not included in predetermined questions previously stored as inquiring screen image information;

temporarily storing the new question submitted by the customer when the new question is received;

storing the new question and an answer thereto as a set of question and answer when the answer thereto has been prepared; and updating the database and the inquiring screen image information with the set of question and answer.

4. An answering system, for providing answers to questions submitted to an online sales center via an online communication system by online customers, said system comprising:

an answer database that stores information including answers respectively corresponding to a minimum necessary plurality of expected customer questions; a question item checker that receives a question submitted by a customer and determines whether the question corresponds to one of predetermined question items, the question specifying information requested by the customer;

a search unit that searches said answer database when said question item checker has determined that the question is included in the predetermined question items;

an online transmission unit that transmits, via the online communication system, an answer obtained by said search unit;

an answer request generator that generates an answer request when said question item checker has determined that the question does not correspond to any of the predetermined question items;

an updating unit that updates the answer database with a new answer obtained responsive to the answer request and including information input to said system responsive to the answer request; and an electronic mail transmission unit that transmits the new answer to the customer via electronic mail when the new answer is obtained responsive to the answer request.

5. The system according to claim 4, wherein said updating unit comprises an inquiring screen image information updating unit that adds the question to the inquiring screen image information for display to the customer.

6. The system according to claim 4, wherein said electronic mail transmission unit transmits the new answer to only the customer that submitted the question.

7. An answering system, for providing answers to questions submitted to an online sales center via an online communication system by online customers, said system comprising;

an answer database that stores information including answers respectively corresponding to a minimum necessary plurality of expected customer questions:

a question item checker that receives a question submitted by a customer and determines whether the question corresponds to one of predetermined question items, the question specifying information requested by the customer;

a search unit that searches said answer database when said question item checker has determined that the question is included in the predetermined question items;

an online transmission unit that transmits, via the online communication system, an answer obtained by said search unit;

an answer request generator that generates an answer request when said question item checker has determined that the question does not correspond to any of the predetermined question items, the answer request notifying an operator to input answer data to said system for preparation of a new answer corresponding to the question;

an updating unit that updates the answer database with a new answer obtained responsive to the answer request and including information input to said system responsive to the answer request, said updating unit comprising a goods master file updating unit that adds a question type code, corresponding to the question, to at least one predetermined question type of the goods master file when the new answer is obtained, the goods master file storing a predetermined question type corresponding to an article code of an article selected by the customer; and an electronic mailer that transmits the new answer to the customer via electronic mail when the new answer is obtained responsive to the answer request.

8. A computer-implemented answering method for answering questions submitted to an automated service system, the method, comprising the steps of:

receiving a question submitted to the automated service system;

searching an answer database for a stored answer to the question;

creating a new answer to the question when a stored answer to said question is not found in the answer database; and updating the answer database with the new answer when the new answer has been created.

9. A a computer-readable medium encoded with a program for providing answers to questions submitted to an automated service system, said program comprising the functions of:

receiving a question submitted to the automated service system;

searching an answer database for a stored answer to the question;

creating a new answer to the question when a stored answer to the question is not found in answer database; and updating the answer database with the new answer when the new answer is created.

10. An automated information system, comprising:

a database manager that updates an answer database with a new answer corresponding to an information request when a search of the answer database fails to find a stored answer corresponding to the information request, the new answer including information input to said system responsive to an indication that the search has failed; and an electronic mailer that sends the new answer to the user via electronic mail when the new answer is generated.

11. The automated answering system of claim 10, wherein said electronic mailer comprises a processing unit that formats the new answer into an electronic mail format and a transmission unit that transmits the formatted new answer to an electronic mail address of the user.

12. The automated answering system of claim 10, wherein the new answer is prepared responsive to the indication that the search has failed and includes at least a portion of information specified in the information request.

13. A method for providing automated information services, the method comprising the steps of:

preparing a new answer corresponding to an information request when a search of an answer database fails to find a stored answer corresponding to the information request, the new answer including information input to a computer system coupled to the answer database in response to an indication that the search has failed; and sending the new answer to the user via electronic mail when the new answer is generated.

14. The method of claim 13, wherein the sending step comprises:

formatting the new answer into an electronic mail format; and transmitting the formatted new answer to an electronic mail address of the user.

15. The method of claim 13, further comprising the step of preparing the new answer responsive to an indication that the search has failed.

16. The method of claim 13, further comprising the step of updating the answer database with the new answer.

* * * * *

UNITED STATES PATENT AND TRADEMARK OFFICE
CERTIFICATE OF CORRECTION

PATENT NO.:    5,890,139
DATED     :    March 30, 1999
INVENTOR(S):   Tetsujiro SUZUKI et al.

It is certified that error appears in the above-identified patent and that said Letters Patent is hereby corrected as shown below:

Col. 1,    line 19, change "," to --.--.

Col. 3,    line 53, change "customer" to --customers--.

Col. 5,    line 56, change "expands" to --expanded--;
line 61, after "transmits" insert --the answers, which has been obtained from the answer--.

Col. 9,    line 67, after "center" insert --,--.

Col. 10,   line 23, delete "is" (first occurrence);
line 44, begin a new paragraph with "a".

Signed and Sealed this

Seventh Day of September, 1999

Attest:

Q. TODD DICKINSON

*Attesting Officer*    *Acting Commissioner of Patents and Trademarks*